United States Patent [19]

Gutterman et al.

[11] 4,095,953
[45] Jun. 20, 1978

[54] MODULAR SYSTEM FOR REDUCING SULFUR DIOXIDE

[75] Inventors: Carl Gutterman; Peter Steiner, both of Edison, N.J.

[73] Assignee: Foster Wheeler Energy Corporation, Livingston, N.J.

[21] Appl. No.: 786,549

[22] Filed: Apr. 11, 1977

Related U.S. Application Data

[63] Continuation of Ser. No. 648,701, Jan. 13, 1976, abandoned.

[51] Int. Cl.$^2$ .......................... C01B 17/04; B01J 8/12
[52] U.S. Cl. .................................... 23/277 R; 23/284; 23/288 G; 23/293 S; 34/167; 34/181; 34/209; 201/34; 423/569; 423/567 R
[58] Field of Search ................. 23/277 R, 284, 288 R, 23/288 G, 293 S; 34/167, 181, 209; 201/34; 423/569, 567 R

[56] References Cited

U.S. PATENT DOCUMENTS

| | | | |
|---|---|---|---|
| 1,089,110 | 3/1914 | Chappell | 423/567 X |
| 2,858,123 | 10/1958 | Niems | 34/167 |
| 3,345,139 | 10/1967 | Kuhne | 23/277 R |
| 3,838,979 | 10/1974 | Sims | 423/567 X |

Primary Examiner—James H. Tayman, Jr.
Attorney, Agent, or Firm—Marvin A. Naigur; John E. Wilson

[57] ABSTRACT

A system for reducing sulfur dioxide to elemental sulfur in which a reactor vessel is divided into a plurality of compartments, and coal is fed from a single source into each of the compartments. A sulfur dioxide rich gas is distributed to each of the compartments and is contacted with the coal to form substantially pure sulfur.

4 Claims, 3 Drawing Figures

MODULAR SYSTEM FOR REDUCING SULFUR DIOXIDE

This application is a continuation of application Ser. No. 648,701, filed Jan. 13, 1976 now abandoned.

BACKGROUND OF THE INVENTION

This invention relates to a system for producing sulfur, and more particularly to a modular system for reducing sulfur dioxide by contacting same with coal at elevated temperatures.

Hydrocarbon fuels which are normally burned in industrial installations, such as coal and oil-fired power stations, contain sulfur which, under normal circumstances, is converted to sulfur dioxide in the combination process. Although in older installations the sulfur dioxide was vented to atmosphere with the other effluent gases from the process, recent air pollution control requirements have placed great emphasis on removing the sulfur dioxide from the gases before the latter are expelled into atmosphere. One successful technique in this respect is to remove the sulfur dioxide from polluted gas streams by adsorption on carbon to form sulfuric acid, followed by a regeneration of the adsorbent to produce a stream of high sulfur dioxide concentration.

In order to form a non-polluting by-product that can be accumulated in a useful form, various systems have also been proposed for converting the sulfur dioxide obtained in the foregoing manner to elemental sulfur. However, many of these latter systems require the use of natural gas or some other relatively expensive reducing agent. In this context, U.S. patent application Ser. No. 489,337, filed July 17, 1974 by Peter Steiner and assigned to the assignee of the present invention discloses a process in which a gas containing sulfur dioxide is contacted with granular coal to produce sulfur. This has the advantage of utilizing crushed coal, which is the least expensive reducing agent, and is thus very attractive from a cost standpoint.

However, according to this process, a single reactor vessel is provided through which the coal is continuously passed and partially combusted in the presence of the sulfur dioxide containing gas to reduce the gas to sulfur. However, the reactor vessel, being a high temperature gas-solid contact device, is subject to heat and mass transfer limitations as to its maximum practical size. As a result, in relatively large systems, these limitations would necessitate the design and construction of a multitude of single reactors. This, of course, is relatively inefficient, especially from a materials standpoint.

SUMMARY OF THE INVENTION

It is therefore an object of the present invention to provide a system for reducing sulfur dioxide to elemental sulfur in which a single reactor vessel of a modular design is used, the size and capacity of which can be varied according to the particular application.

Toward the fulfillment of this and other objects, a system of the present invention comprises a reactor vessel, means dividing said vessel into a plurality of compartments, a coal inlet associated with said compartment, an ash outlet associated with each compartment, a single source of coal, means connecting said coal source to each of said compartments, a single source of sulfur dioxide, and means connecting said source to each of said compartments whereby said sulfur dioxide is contacted with said coal in said vessel and is reduced to sulfur.

BRIEF DESCRIPTION OF THE DRAWINGS

The above brief description, as well as further objects, features, and advantages, of the present invention will be more fully appreciated by reference to the following detailed description of a presently preferred but nonetheless illustrative embodiment in accordance with the present invention, when taken in connection with the accompanying drawings, wherein.

DESCRIPTION OF THE PREFERRED EMBODIMENTS

Figure 1:
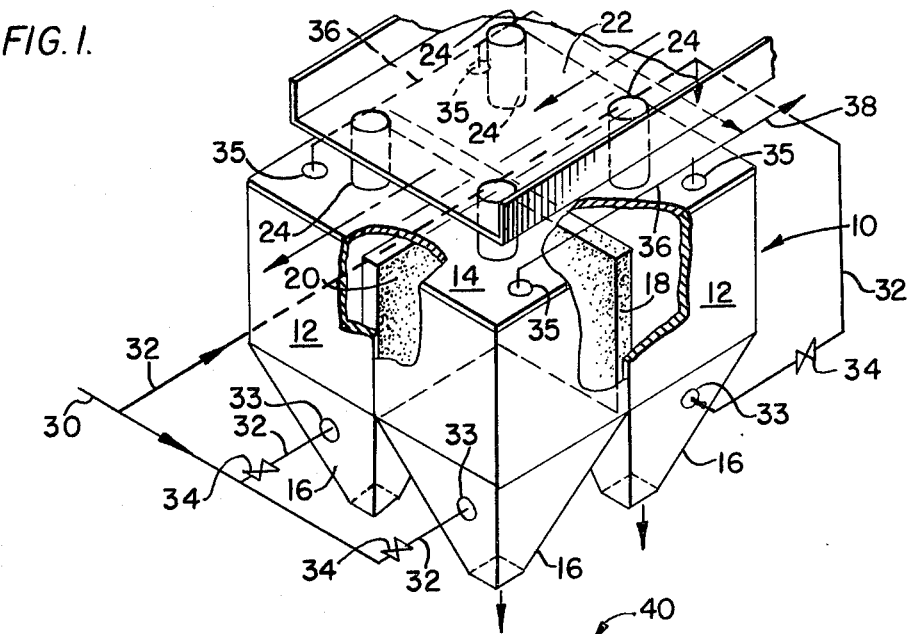
FIG. 1 is a partial elevational-partial schematic view depicting the system of the present invention.

Referring specifically to FIG. 1 the reference numeral 10 refers in general to a reactor vessel which is formed by four walls 12 and a ceiling 14. The bottom of the vessel 10 is open and receives four truncated hopper sections 16 each having an inlet opening of a relatively large size communicating with the interior of the vessel and a discharge opening of a relatively small size for discharging ash, as will be described in detail later.

A pair of refractory walls 18 and 20 extend across the vessel 10 and are attached to the side walls 12 in any known manner. The hopper sections 16 and the walls 18 and 20 thus divide the reactor vessel 10 into four compartments each of which is adapted to operate independently of the other, as will also be described in detail later.

A single trough 22 extends immediately over the ceiling portion 14 of the vessel 10 and is adapted to receive crushed coal from an external source (not shown). The trough 22 communicates with each of the compartments defined within the vessel 10 by means of a plurality of feed pipes 24. The coal is fed along the trough 22 in any known manner in the direction shown by the flow arrows and is introduced in the vessel compartments through the pipes 24. Any excess coal not passing into the feed pipes 24 will pass to the discharge end of the trough 22 and can be recirculated in a conventional manner.

A main gas feed line 30 is provided which is connected to a source (not shown) of sulfur dioxide rich gas such as the regenerator described above. The line 30 is connected to a plurality of branch lines 32 for feeding the gas into each of the compartments in the vessel 10 through inlet openings 33 formed in the hopper sections 16. A valve 34 is provided in each line 32 to control the amount of gas introduced into each compartment.

As a result of the foregoing, the coal passes in a general downwardly direction through the vessel compartments in a counterflow relationship to the gas passing upwardly to reduce the sulfur dioxide in the gas to elemental sulfur, as will be described later. An exhaust outlet 35 for each compartment is formed through the ceiling 14 and each outlet is connected to a branch exhaust line 36, with the latter, in turn, being connected to line 38 for passing the sulfur gas externally of the system for further treatment.

Figure 2:
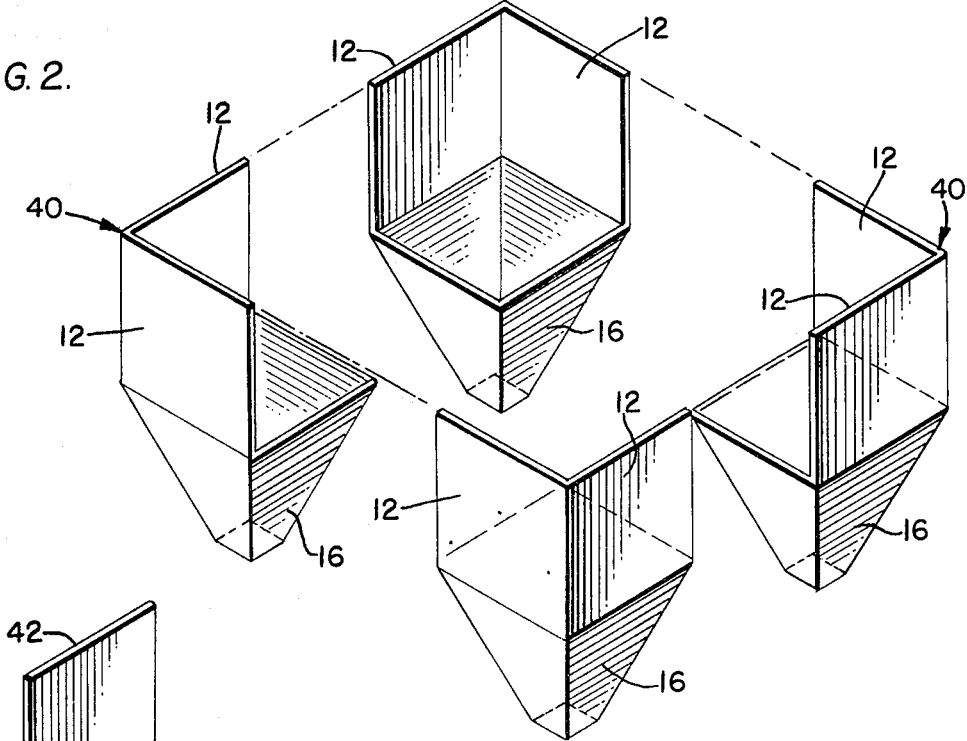
FIG. 2 is an exploded partial view of the reactor vessel of FIG. 1.

The reactor vessel 10 is formed by four modular units 40 as better shown with reference to FIG. 2. In particular, each unit 40 includes a single hopper section 16 and two half portions of each wall 12, which half portions meet at a corner. In this manner, the modules 40 can be easily assembled by fastening their respective wall portions together such as by welding, or the like, and the vessel thus formed is divided into separate compartments by means of the hopper sections 16 and the refractory walls 18 and 20.

Figure 3:
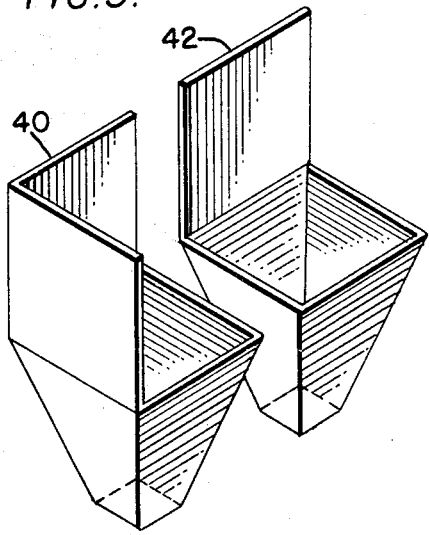
FIG. 3 is a partial view similar to FIG. 2 but showing an alternate arrangement used to form a reactor vessel of the present invention.

It is noted that the module sections 40 are not limited to the configuration depicted in FIG. 2, but can be in the form shown by the reference numeral 42 in FIG. 3 in which the section includes only one side wall portion. In this manner the section 42 can be inserted between adjacent modular sections 40 in order to expand the size of the entire reactor vessel. Of course, it is understood that any number of module sections 42 may be placed between the sections 40, and the sections 40 and 42 can be used in any combination depending on the particular design requirements.

It is understood that each compartment can be equipped with its own combustion air supply incorporating an external start-up heater, or, as an alternate, burners could be placed in each compartment and could be arranged so their flames do not impinge directly on the coal. In this manner the heat of combustion of the fuel along with the heat generated by the oxidation of the coal by excess burner air would raise and maintain each compartment at the proper reaction temperature, which according to the present invention is between 1,100° F. and 1,550° F.

In operation, the coal from a single source is fed into the trough 22 from which it passes through the pipes 24 and into each of the separate compartments formed within the reactor vessel 10. The vessel is maintained within the above-mentioned temperature range by partial combustion of the coal as the latter passes downwardly through each compartment. The sulfur dioxide rich gas is fed from the main line 30 and the branch lines 32 and through the inlets 33 into the separate compartments in the vessel 10 where it passes upwardly in a counterflow relation to the burning coal. As a result, upon contact of the sulfur dioxide rich gas with the burning coal, the coal is oxidized and the sulfur dioxide is reduced to elemental sulfur. The sulfur is then passed outwardly from the outlets 35 in the ceiling 14 of the vessel and through the branch exhaust lines 36 and the main exhaust line 38 from which it can be passed to an external unit, such as a condenser, for further treatment. The ash from the bottom outlets of the hopper sections 16 can be recycled to recover any unburned coal present therein, and/or can be disposed of in a conventional manner.

The system of the present invention enjoys several advantages when compared to prior art designs. For example, the modular vessel 10 is more efficient from a materials standpoint when compared to a series of individual vessels. Also, the system of the present invention can accommodate a relatively large amount of coal and sulfur rich gas without the heat and mass transfer limitations associated with a conventional vessel, as discussed above.

In addition, the system of the present invention enjoys an increased efficiency and flexibility over a single vessel since each module of the system of the present invention can be taken off stream and put on stream as desired, depending on the particular load conditions.

It is understood that several variations can be made in the foregoing without departing from the scope of the invention. For example, steam can be mixed with the sulfur dioxide rich gas before the latter is introduced into reactor vessel 10, in the manner disclosed in the above identified application. Also, a different coal feed system for supplying the compartments of the vessel 10 could be used. Further, level indicators could be located at the top of each module to sense a lack of flow of the coal in the lines 36 supplying the modules, and to provide a warning signal, or the like.

Of course, other variations of the specific construction and arrangement of the system disclosed above can be made by those skilled in the art without departing from the invention as defined in the appended claims.

What is claimed is:

1. A system for reducing sulfur dioxide comprising a reactor vessel divided into a plurality of modular reactor vessel sections, each section including a lower hopper portion and an upper portion having at least one wall connecting with a wall of said hopper portion, said sections being connected in an abutting relation so that said walls together define an upper boundary wall of the reactor vessel, partition means disposed within said upper boundary wall for dividing the upper portion of said vessel into a plurality of compartments respectively communicating with said hopper portions, a coal inlet located in the upper portion of each compartment, a single coal supply means for continuously supplying coal to each compartment through the respective coal inlets so that the coal will pass downwardly by gravity through said compartments and their corresponding hopper portions, a gas inlet located in each hopper portion, gas supply means for continuously supplying gas to each hopper portion through the respective gas inlets so that the gas will pass upwardly through said hopper portions and their corresponding compartments and contact said coal in a counterflow relation, gas discharge means located in the upper portion of each compartment, and coal discharge means located in the lower portion of each hopper.

2. The system of claim 1, wherein the upper portion of at least one of said vessel sections is formed by two walls joining at a corner.

3. The system of claim 1, where there are four vessel sections, the upper portion of each being formed by two walls joining at a corner.

4. The system of claim 1, wherein there are at least six vessel sections, the upper portions of four of which being formed by two walls joining at a corner and the upper portions of at least two of which being formed by one wall.

* * * * *